(12) United States Patent
Lee

(10) Patent No.: US 10,479,555 B2
(45) Date of Patent: Nov. 19, 2019

(54) DEVICE FOR ADJUSTING THE CAPACITY OF A BEVERAGE CUP

(71) Applicant: Jae-su Lee, Seoul (KR)

(72) Inventor: Jae-su Lee, Seoul (KR)

(73) Assignee: Jae-su Lee, Seoul (KR)

( * ) Notice: Subject to any disclaimer, the term of this patent is extended or adjusted under 35 U.S.C. 154(b) by 37 days.

(21) Appl. No.: 16/012,578

(22) Filed: Jun. 19, 2018

(65) Prior Publication Data

US 2018/0297747 A1    Oct. 18, 2018

Related U.S. Application Data

(63) Continuation of application No. PCT/KR2016/014930, filed on Dec. 20, 2016.

(51) Int. Cl.
| | |
|---|---|
| *B65D 21/08* | (2006.01) |
| *A47G 19/22* | (2006.01) |
| *G01F 23/20* | (2006.01) |
| *G01G 19/52* | (2006.01) |
| *G01G 19/414* | (2006.01) |
| *G01G 23/36* | (2006.01) |

(52) U.S. Cl.
CPC ............ *B65D 21/08* (2013.01); *A47G 19/22* (2013.01); *G01G 19/4146* (2013.01); *G01G 19/52* (2013.01); *A47G 2200/22* (2013.01); *G01F 23/20* (2013.01); *G01G 23/36* (2013.01)

(58) Field of Classification Search
CPC ............... A47G 19/22; A47G 19/2205; A47G 19/2255; A47G 2200/22; A47G 2200/223; A47G 2200/226; B65D 21/08; B65D 21/083; G01G 19/52; G01G 23/36; G01G 19/414; G01G 19/4146; G01F 23/20
See application file for complete search history.

(56) References Cited

U.S. PATENT DOCUMENTS

| | | | | |
|---|---|---|---|---|
| 9,340,323 | B1* | 5/2016 | Tate | B65D 23/001 |
| 2013/0137490 | A1* | 5/2013 | Quehl | G01F 23/0015 |
| | | | | 455/567 |
| 2014/0311239 | A1* | 10/2014 | Marjanovic | G01F 23/20 |
| | | | | 73/296 |
| 2016/0150897 | A1* | 6/2016 | Zwarych | G01G 17/04 |
| | | | | 177/25.13 |
| 2016/0166096 | A1* | 6/2016 | DiMaria-Ghalili | G06Q 50/24 |
| | | | | 702/19 |
| 2017/0219416 | A1* | 8/2017 | Kumar | G01G 19/4146 |
| 2018/0348036 | A1* | 12/2018 | Hsiao | G01F 22/00 |

FOREIGN PATENT DOCUMENTS

DE    102009026802 A1 *  6/2009  ............ G01F 23/20

* cited by examiner

*Primary Examiner* — Randy W Gibson
(74) *Attorney, Agent, or Firm* — Sul Lee

(57) ABSTRACT

A device for adjusting the capacity of a beverage cup is provided. The device includes an insertion unit having at least a volume smaller than an interior volume of a cup and a shape in which a lower end portion of the insertion unit comes in contact with a bottom portion of the cup when inserted into the cup. The insertion unit includes a first magnet sealed in a bottom portion of the insertion unit. The device also includes an outer fixed unit to be placed under the cup. The outer fixed unit includes a second magnet sealed in the upper portion of the outer fixed unit for interacting with the first magnet of the insertion unit and securing the insertion unit to the cup by a magnetic force between the magnets.

6 Claims, 3 Drawing Sheets

DEVICE FOR ADJUSTING THE CAPACITY OF A BEVERAGE CUP

CROSS-REFERENCE TO RELATED APPLICATION

This Application is a continuation of International Application No. PCT/KR2016/014930 filed on Dec. 20, 2016, which claims priority to Korean Application No. KR20150183168A filed in Dec. 21, 2015. The disclosures of these applications including the specifications, the drawings and the claims are hereby incorporated by reference in their entirety.

FIELD OF THE INVENTION

The embodiments discussed herein are related to a device for adjusting the capacity of a beverage cup, and more particularly, to a device which is installed in a cup when a user drinks an alcoholic or nonalcoholic beverage to adjust the capacity of the cup to fit the user's personal drinking capacity.

BACKGROUND

In the following description of the present disclosure, the case of a cup (glass) for drinking an alcoholic beverage will be described as an example.

In Korean culture, there is a custom in which everyone who attends an event at which an alcoholic beverage is being consumed drinks a full cup of the beverage regardless of their personal drinking capacity (or tolerance to alcohol).

This can put a great deal of social pressure on those with a relatively low drinking capacity, and women in particular, and can even cause health problems.

Therefore, although it would be preferable for everyone to drink according to their own drinking capacity, in order to form a social life or personal relations, many people often drink together using cups, i.e., in units of full cups, and end up drinking too much.

In order to address such a problem, Korean Patent Laid-Open Publication No. 10-2011-0017637 (a capacity-adjustable cup) discloses a structure in which a lift member 120 is inserted into a main body 110 of a cup and is moved up and down, as illustrated in FIG. 1. A driving unit 130 is provided at an outer lower portion of the main body 110 of the cup, and a screw member 133 is inserted through a bottom portion of the main body 110 of the cup and is then coupled to the lift member 120. Then, the screw member 133 is rotated by adjusting a handle 134 to raise or lower the lift member 120.

Therefore, a user can adjust the volume of an alcoholic beverage stored in the main body 110 to a level appropriate to their own drinking capacity by raising and lowering the lift member 120.

However, in order to use such a conventional cup when drinking an alcoholic beverage, a user needs to bring the main body 110 of the cup with the lift member 120 and the driving unit 130 mounted thereon, and this may cause alienation from others who are drinking with the user using another type of cup.

Furthermore, a lead-in groove 122 is formed in the lift member 120 to form a sealing portion 123, and the screw member 133 of the driving unit 130 passes through the bottom portion of the main body 110 to connect with the lift member 120. Therefore, the structure is complicated, and foreign substances easily adhere to the lift member 120 and the driving unit 130, which can be unsanitary and be very disadvantageous in hygiene management.

SUMMARY OF THE INVENTION

Problems to be Solved

Therefore, in order to address the above-mentioned problems in the related art, it is an objective of the present disclosure to provide a device for adjusting the capacity of a beverage cup that has a simple structure that a user can mount to a cup that is generally provided at a drinking establishment, and thus can help one determine one's own drinking capacity while minimizing a sense of alienation from others and is also sanitary and advantageous in hygiene management.

Solutions to Solve the Problems

According to an embodiment, a device for adjusting the capacity of a beverage cup includes and insertion unit having at least a volume smaller than an interior volume of a cup and a shape in which a lower end portion of the insertion unit comes in contact with a bottom portion of the cup when inserted into the cup, the insertion unit comprising a first magnet sealed in a bottom portion of the insertion unit; and an outer fixed unit configured to be placed under the cup, the outer fixed unit comprising a second magnet sealed in the upper portion of the outer fixed unit for interacting with the first magnet of the insertion unit and securing the insertion unit to the cup by a magnetic force between the magnets.

According to an embodiment, the insertion cup is made of a transparent or opaque material.

According to an embodiment, the outer fixed unit includes a sensor configured to sense a movement of the cup; a CPU configured to receive a signal indicating movement of the cup from the sensor and outputting an alarm generation signal when receiving two consecutive signals from the sensor within a threshold time; and a display unit configured to generate an alarm by an output of the alarm generation signal from the CPU.

According to an embodiment, the outer fixed unit includes a sensor configured to sense a weight; a CPU configured to accumulate weight values that increase when a signal is received from the sensor indicating added weight, and output an accumulated weight value; and a display unit configured to display an output of the CPU indicating the accumulated weight value.

According to an embodiment, the outer fixed unit includes an input unit configured to receive user input indicating information of an alcoholic beverage; a sensor configured to sense a weight; a CPU configured to accumulate weight values that increase when a signal is received from the sensor indicating added weight, calculating an actual amount of alcohol consumed based on the accumulated weight value and the user information of the alcoholic beverage, and outputting the actual amount of alcohol consumed according to the information of the alcoholic beverage input from the input unit with respect to the accumulated weight values; and a display unit configured to display an output of the CPU indicating the actual amount of alcohol consumed.

According to an embodiment, the device further includes an alcohol measurement sensor configured to measure an alcohol content of the alcoholic beverage, the outer fixed unit including a sensor configured to sense a weight of the alcoholic beverage; a CPU configured to accumulate weight values that increase when a signal is received from the sensor indicating added weight, calculating an actual amount of alcohol consumed based on the accumulated weight value and the measured alcohol content, and outputting the actual amount of alcohol consumed with respect to the accumulated weight value; and a display unit configured to display an output of the CPU.

Effects of the Invention

According to aspects of the present disclosure, the insertion unit and the outer fixed unit can be attached and detached by the magnets, the insertion unit allowing the user to adjust the volume of an alcoholic or nonalcoholic beverage being consumed from a cup provided at an existing restaurant and allowing one to drink at a similar pace with others while considering relative drinking capacity that reflects one's own personal drinking capacity.

In addition, it is possible to avoid the sense of alienation from others caused by differences in drinking capacity. Further, the structure is very simple, easy to use, and hygienic because the insertion unit is secured in the cup and independent from the outer fixed unit.

DETAILED DESCRIPTION

Figure 1:
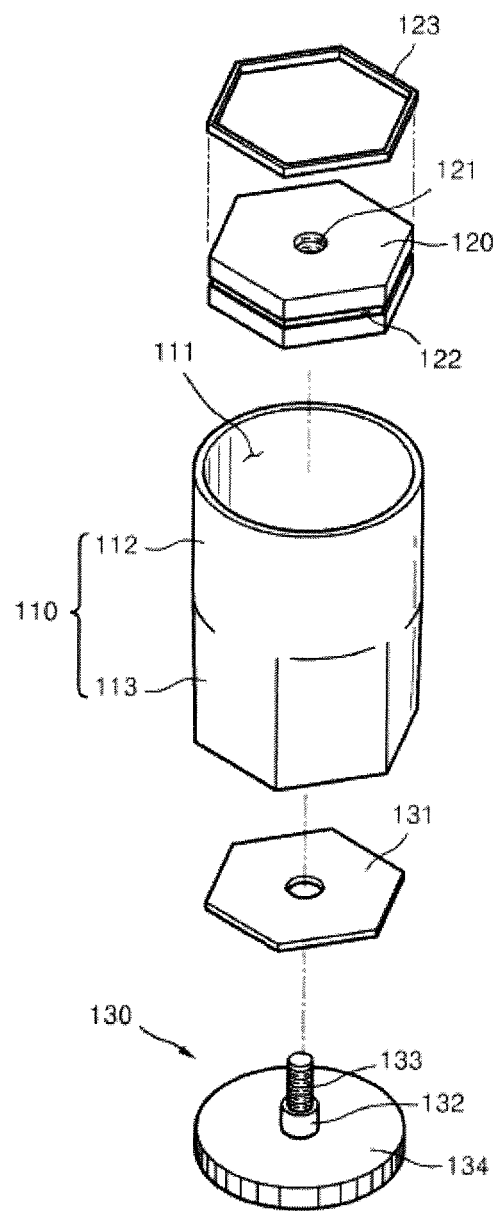
FIG. 1 is a view illustrating the structure of a cup according to the related art.

Embodiments according to aspects of the present disclosure will be described in detail with reference to the accompanying drawings.

While the present disclosure is described herein by way of example using embodiments and illustrative drawings, those skilled in the art will recognize that the disclosure is not limited to the embodiments of drawing or drawings described, and are not intended to represent the scale of the various components. Further, some components that may form a part of the disclosure may not be illustrated in certain figures, for ease of illustration, and such omissions do not limit the embodiments outlined in any way. It should be understood that the drawings and detailed description thereto are not intended to limit the disclosure to the particular form disclosed, but on the contrary, the disclosure is to cover all modifications, equivalents, and alternatives falling within the scope of the present disclosure as defined by the appended claim. As used throughout this description, the word "may" is used in a permissive sense (i.e. meaning having the potential to), rather than the mandatory sense, (i.e. meaning must). Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present disclosure. It is not suggested or represented that any or all of these matters form part of the prior art base or were common general knowledge in the field relevant to the present disclosure.

The present disclosure is described hereinafter by various embodiments with reference to the accompanying drawing, wherein reference numerals used in the accompanying drawing correspond to the like elements throughout the description. This disclosure may, however, be embodied in many different forms and should not be construed as limited to the embodiment set forth herein. Rather, the embodiment is provided so that this disclosure will be thorough and complete and will fully convey the scope of the disclosure to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary and are not intended to limit the scope of the disclosure.

In the following description of the present disclosure, the case of drinking an alcoholic beverage using a cup will be described as an example.

Figure 2:
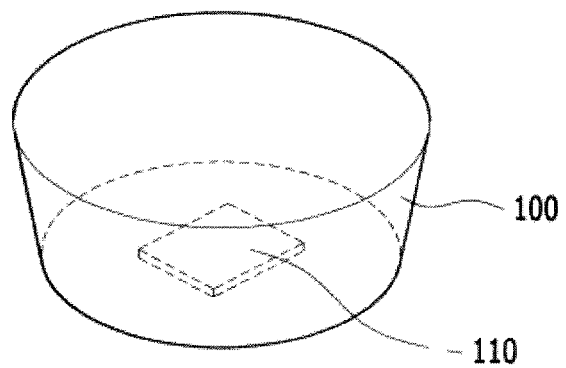
FIG. 2 is a view illustrating the structure according to one aspect of the present disclosure.
Figure 2:
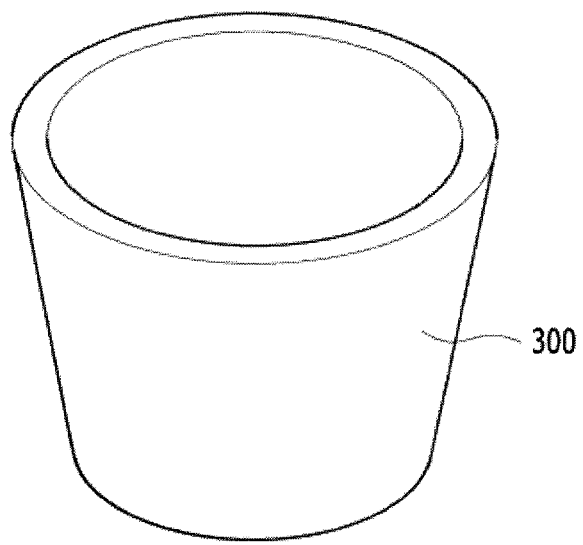
Figure 2:
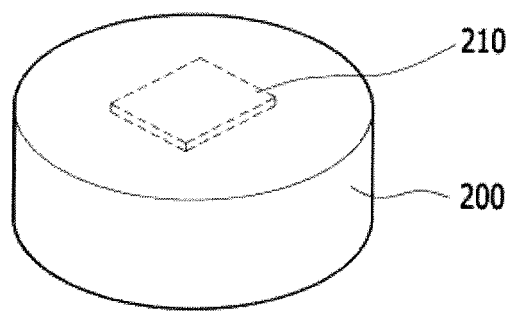

FIG. 2 is a view illustrating the structure according to one aspect of the present disclosure, which includes an insertion unit 100 and an outer fixed unit 200.

According to an embodiment, the insertion unit 100 may be made of a transparent material such as glass or crystal and may be inserted into the cup 300. The insertion unit 100 has a volume smaller than the interior space of the cup 300 and may have a variety of shapes.

According to an embodiment, when the insertion unit 100 is inserted into the cup 300, it may have a volume corresponding to 30% of the cup 300, or a volume corresponding to 50% or 60% of the cup 300.

In addition, when the shape of the insertion unit 100 is inserted as far into the cup 300 as possible, the lower end portion of the insertion unit 100 may come in contact with the inner bottom surface of the cup 300, and preferably, the side portion of the insertion unit 100 has a shape corresponding to the inner side wall(s) of the cup 300.

According to an embodiment, a magnet 150 may be provided in the lower portion of the insertion unit 100. When the insertion unit 100 is formed, the magnet 150 may be made waterproof and sealed in to be located in a recess and not exposed to the outside, so that it does not come in contact with or contaminate the alcoholic beverage.

According to an embodiment, the insertion unit 100, which is made of a transparent material such as glass or crystal, is formed by injection molding such that the magnet 150 may be pre-positioned on the inside so that the magnet 150 is not exposed to the outside, thereby preventing harmful ingredients from the magnet 150 from flowing out even when the insertion unit 100 is inserted into the cup 300.

According to an embodiment, the outer fixed unit 200 may also be made of a transparent material such as glass or crystal, or a colored opaque material, and may be positioned under the cup 300. As in the insertion unit 100, a magnet 210 that is sealed in and not exposed to the outside may be provided in an upper inner side below a top surface of the outer fixed unit 200.

According to an embodiment the upper end portion of the outer fixed unit 200 may have a substantially same shape and surface area as the lower end portion of the cup 300. According to an embodiment, the upper end portion of the outer fixed unit 200 has a groove shape for seating the lower end portion of the cup 300. The outer side of the outer fixed unit 200 may have an upright cylindrical shape or may be formed to flare out and be wider toward the lower side to stably support the cup 300 when the cup 300 is placed thereon.

The aspect of use of the device according to the present disclosure will now be described. As illustrated in FIG. 2, the transparent or opaque insertion unit 100 may be inserted into the cup 300 which is provided at a drinking establishment, such as a restaurant or a pub, such that the lower end of the insertion unit 100 can come in contact with the bottom portion of the cup 300. The outer fixed unit 200 may then be placed under the cup 300. Accordingly, the magnetic force between the magnet 150 of the insertion unit 100 and the magnet 210 of the outer fixed unit 200 can be used to keep the bottom of cup 300 attached to the top of the outer fixed unit 200, such that the insertion unit 100 and the outer fixed unit 200 are secured to the inner side and the lower outer side of the cup 300, respectively.

According to an embodiment, the user selects the size of the insertion unit 100 that is inserted based on his or her personal drinking capacity such that the remaining top space of the cup 300 is filled with the alcoholic beverage, thereby reducing the volume of the cup 300 accordingly. According to an embodiment, when the insertion unit 100 is made of a transparent material, it may blend in with and not be easily distinguished from the existing cups from the outside.

According to an embodiment, when the outer fixed unit 200 is also made of a transparent material, it appears to be integral with the cup 300, helping the combination of the cup 300 and the outer fixed unit 200 blend in with other cups at the drinking establishment.

When a force is applied the outer fixed unit 200 to be detached from the cup 300, the insertion unit 100 can also be naturally detached from the inside of the cup 300.

Since the insertion unit 100 can be fixed to the inside of the cup 300 by the magnets in this manner, it is hygienic and the structure is very simple.

Figure 3:
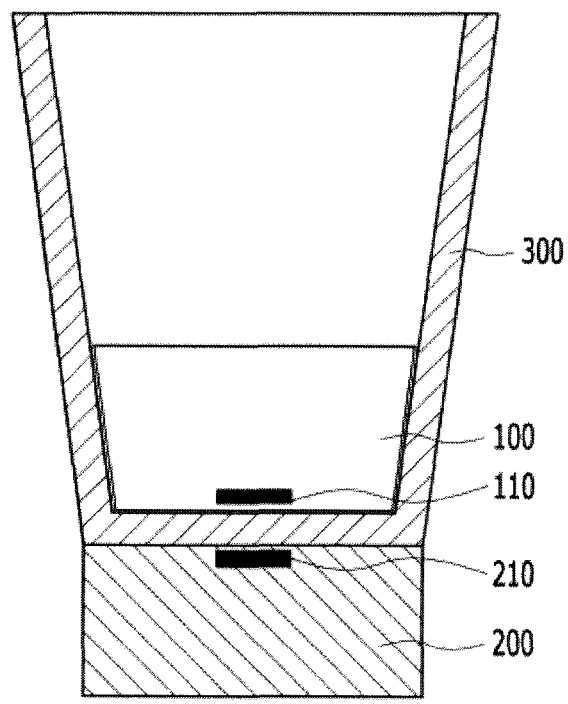
FIG. 3 is a view illustrating a combined sectional structure according to one aspect of the present disclosure.
Figure 4:
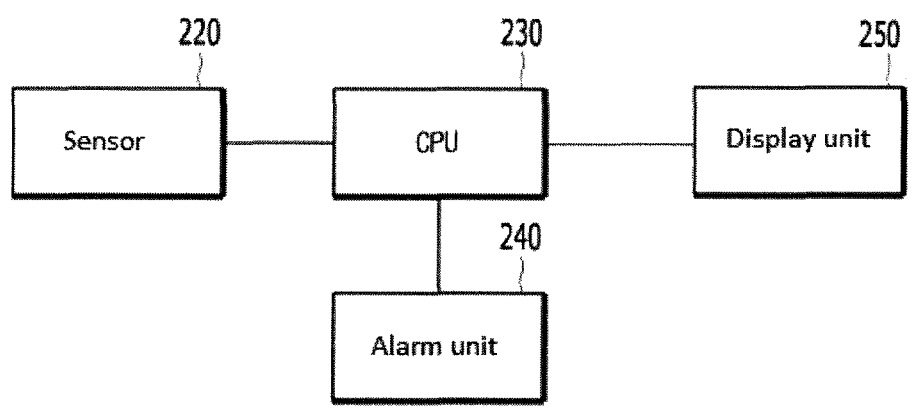
FIG. 4 is a view illustrating an internal circuitry structure of the outer fixed unit.

FIG. 3 is a view illustrating a circuitry structure located inside the outer fixed unit 200. Even if the amount that the user drinks per cup/glass is reduced by the insertion unit 100, the user can still drink a large amount if they drink many times. According to an embodiment, the amount that the user has drunk can be monitored and controlled by the circuitry.

To this end, a motion sensor 220 may be provided inside the outer fixed unit 200 to transmit a motion detection signal to a CPU 230 when the user picks up the cup 300.

After the motion detection signal is input once, when the motion detection signal is input again from the sensor 220 within a threshold time corresponding to a case in which the user is drinking too much, the CPU 230 may generate a visual or auditory alarm through a display unit 240.

According to an embodiment, the display unit 240 may be in a variety of forms, such as an LCD panel, an LED, a speaker, etc.

Therefore, the user can monitor his/her rate of consumption through such an alarm and can drink according to their own drinking pace capacity.

The outer fixed unit 200 may be made of a synthetic resin material to cover the circuitry built therein.

According to an embodiment, the sensor 220 may include a weight detection sensor or scale for measuring the cumulative amount of alcoholic beverages consumed.

According to an embodiment, when the user initially sets an 'initial mode' through an input unit (250), the sensor 220 may sense the overall weight of the cup 300 and the insertion unit 100, so that the CPU 230 stores it as an 'initial value.' Thereafter, when the user switches to a 'measurement mode' through the input unit, weights of alcoholic beverages filled in the cup 300 may be accumulated and the accumulated value may be displayed through the display unit 240.

According to an embodiment, when the weight is increased compared to the current point of time, only the increased weight is accumulated without measuring the reduced weight.

According to an embodiment, a user interface includes buttons to allow the user to select among types of alcoholic beverages. For example, soju, beer, and liquor may be selected through the input unit, and the CPU 230 may calculate the amount of alcohol consumed based on the total weight of the alcoholic beverage being consumed and display it through the display unit 250, as described above.

According to an embodiment, the CPU 230 may store alcohol content data for each type of alcoholic beverage.

If the user selects soju having an alcohol concentration of 25% and the total amount of alcohol to be consumed is 200 g, the drinking capacity of alcohol may be displayed as 50 g through the display unit 250.

According to an embodiment, an alcohol measurement sensor is provided and when the sensor is exposed to the alcoholic beverage, the alcohol measurement sensor can automatically sense the amount of alcohol contained in the alcoholic beverage without the user manually selecting the type of alcoholic beverage. Then, the CPU 230 can calculate an actual amount of alcohol consumed based on the total weight of the alcoholic beverage and display it through the display unit 250, as described above.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the disclosure is anticipated to hold on to all other such alternatives, modifications, and variations that fall within the scope of the present disclosure and appended claim.

DESCRIPTION OF REFERENCE NUMERALS

100: Insertion unit
110: Magnet
200: Outer fixed unit
210: Magnet
300: Cup

What is claimed is:

1. A device for adjusting the capacity of a beverage cup, comprising:
   an insertion unit having at least a volume smaller than an interior volume of a cup and a shape in which a lower end portion of the insertion unit comes in contact with a bottom portion of the cup when inserted into the cup, the insertion unit comprising a first magnet sealed in a bottom portion of the insertion unit; and an outer fixed unit configured to be placed under the cup, the outer fixed unit comprising a second magnet sealed in the upper portion of the outer fixed unit for interacting with the first magnet of the insertion unit and securing the insertion unit to the cup by a magnetic force between the magnets.

2. The device of claim 1, wherein the insertion unit is made of a transparent or opaque material.

3. The device of claim 1, wherein the outer fixed unit comprises:
- a sensor configured to sense a movement of the cup;
- a CPU configured to receive a signal indicating movement of the cup from the sensor and outputting an alarm generation signal when receiving two consecutive signals from the sensor within a threshold time; and
- a display unit configured to generate an alarm by an output of the alarm generation signal from the CPU.

4. The device of claim 1, wherein the outer fixed unit comprises:
- a sensor configured to sense a weight;
- a CPU configured to accumulate weight values that increase when a signal is received from the sensor indicating added weight, and output an accumulated weight value; and
- a display unit configured to display an output of the CPU indicating the accumulated weight value.

5. The device of claim 1, wherein the outer fixed unit comprises:
- an input unit configured to receive user input indicating information of an alcoholic beverage;
- a sensor configured to sense a weight;
- a CPU configured to accumulate weight values that increase when a signal is received from the sensor indicating added weight, calculating an actual amount of alcohol consumed based on the accumulated weight value and the user information of the alcoholic beverage, and outputting the actual amount of alcohol consumed according to the information of the alcoholic beverage input from the input unit with respect to the accumulated weight values; and
- a display unit configured to display an output of the CPU indicating the actual amount of alcohol consumed.

6. The device of claim 1, further comprising an alcohol measurement sensor configured to measure an alcohol content of the alcoholic beverage, wherein the outer fixed unit comprises:
- a sensor configured to sense a weight of the alcoholic beverage;
- a CPU configured to accumulate weight values that increase when a signal is received from the sensor indicating added weight, calculating an actual amount of alcohol consumed based on the accumulated weight value and the measured alcohol content, and outputting the actual amount of alcohol consumed with respect to the accumulated weight value; and
- a display unit configured to display an output of the CPU.

* * * * *